US012584820B2

(12) United States Patent
Azarfar et al.

(10) Patent No.: US 12,584,820 B2
(45) Date of Patent: Mar. 24, 2026

(54) SYSTEM FOR MONITORING A ROLLING BEARING, ASSOCIATED ROLLING BEARING AND METHOD

(71) Applicant: Aktiebolaget SKF, Gothenburg (SE)

(72) Inventors: Alireza Azarfar, Utrecht (NL);
Andreas Clemens Van Der Ham,
Utrecht (NL); Dominik Fritz, Würzburg
(DE); Stefan Engbers, Wuerzburg
(DE); Juergen Reichert, Donnersdorf
(DE); Defeng Lang, Delft (NL)

(73) Assignee: Aktiebolaget SKF, Gothenburg (SE)

( * ) Notice: Subject to any disclaimer, the term of this
patent is extended or adjusted under 35
U.S.C. 154(b) by 431 days.

(21) Appl. No.: 18/111,860

(22) Filed: Feb. 20, 2023

(65) Prior Publication Data

US 2023/0287936 A1     Sep. 14, 2023

(30) Foreign Application Priority Data

Mar. 10, 2022    (DE) .......................... 102022202406.0

(51) Int. Cl.
*G01M 13/04*         (2019.01)

(52) U.S. Cl.
CPC ......... *G01M 13/04* (2013.01); *F16C 2233/00*
(2013.01)

(58) Field of Classification Search
None
See application file for complete search history.

(56) References Cited

U.S. PATENT DOCUMENTS 10,371,206 B2    8/2019  van der Ham et al.
11,052,360 B2 *  7/2021  Bird ........................ B01F 27/95

2016/0187226 A1*  6/2016  Tsutsui ................ G01M 13/045
                                                      73/593
2017/0096984 A1*  4/2017  Kacmarcik ........... F16C 19/522
2019/0301975 A1*  10/2019  Sugiura ............... G01M 13/045
2022/0222167 A1*  7/2022  Sampaio ............. G06F 16/2462

FOREIGN PATENT DOCUMENTS

CN           107542758 B       7/2020
WO      WO-2011144468 A1 * 11/2011   ............ F16C 33/366

* cited by examiner

*Primary Examiner* — Howard Cortes
(74) *Attorney, Agent, or Firm* — THE GARCIA-ZAMOR
LAW FIRM; Ruy Garcia-Zamor

(57)                ABSTRACT

A monitoring system is proposed.

The monitoring system comprises a rolling bearing comprising a first ring and a second ring (7, 8) capable of rotating concentrically relative to one another, and at least one row of rolling elements (5) interposed between a first raceway and a second raceway respectively provided on the first and second rings, wherein:

at least one of the rolling elements (5) of the rolling bearing is a sensorized rolling element comprises at least one sensor measuring at least one parameter of the sensorized rolling element and a wireless transmitter to transmit the measurements of the sensor, and wherein the system comprises:

a receiving device (21) configured to receive the measurements of the sensor of the sensorized rolling element of the rolling bearing, and a processing device (23) configured to process the measurements received by the receiving device to detect damage and/or a contamination of the rolling bearing (2).

2 Claims, 5 Drawing Sheets

SYSTEM FOR MONITORING A ROLLING BEARING, ASSOCIATED ROLLING BEARING AND METHOD

CROSS-REFERENCE TO RELATED APPLICATIONS

This application claims priority to and benefit of the following German patent application: DE 102022202406.0, filed Mar. 10, 2022; which is hereby incorporated by reference in its entirety as if fully set forth herein.

BACKGROUND

The present invention is directed to a method and system for monitoring a rolling bearing in a machine.

More particularly, the invention deals with monitoring a rolling bearing using a sensorized rolling element.

Generally, a bearing is monitored to address predictive maintenance.

Known methods of condition monitoring of bearings are based on vibration, and partly in combination with temperature measurement. However, only after the bearing is damaged, the deterioration of the bearing is observed by analysing the vibrations so that the deterioration of the bearing cannot be avoided.

SUMMARY

Moreover, finding the severity of the defect in bearing is also very tedious relying on vibration.

In addition, the condition monitoring using vibrations deteriorates at low speed of the bearing or high noise.

At least one sensor is implemented on or near the bearing to determine the vibrations and transmits a signal comprising measurements to a receiver.

The transfer function between the sensor and the receiver impedes the detectability of the signal at the sensor.

The document U.S. Pat. No. 10,371,206 discloses a sensorized roller comprising a measuring device for measuring deformation of the roller and electronics for processing a deformation signal from the measuring device and wirelessly transmitting the processed deformation signal to an external receiver.

The sensorized roller is implemented in a roller bearing to measure the deformations of the rollers of the bearing.

The known sensorized roller cannot detect surface damage and detect contamination in the bearing.

Consequently, the present invention intends to improve the accuracy of condition monitoring of a rolling bearing using a sensorized rolling element.

According to an aspect, a method for monitoring a rolling bearing in a machine, the rolling bearing comprising a first ring and a second ring capable of rotating concentrically relative to one another, and at least one row of rolling elements interposed between a first raceway and a second raceway respectively provided on the first and second rings, at least one of the rolling elements is a sensorized rolling element comprising at least one sensor measuring parameter of the sensorized rolling element, the method comprising:

transmitting measurements of the sensor by a wireless transmitter of the sensorized rolling element, receiving the measurements of the sensor by a receiving device, and processing the measurements received from the receiving device by a processing device to detect damage and/or a contamination of the rolling bearing.

The proposed methods permit to detect a damage and/or a contamination of the rolling bearing from sensors implemented in the sensorized roller at an early stage before the damage deteriorates irremediably the rolling bearing to initiate preventive actions when the alarm is initiated.

Preferably, the parameter of the sensorized rolling element comprises the temperature of the sensorized rolling element, and/or the load applied on the sensorized rolling element, and/or the rotational speed of the sensorized rolling element, and/or the axial load offset acting on the sensorized rolling element, and/or the preload acting on the sensorized rolling element and/or the sensorized rolling element slip, the method comprising:

measuring the parameter by the sensor of the sensorized rolling element when the machine is operating during a predefined duration following the implementation of the rolling bearing in the machine, and determining a distribution of each parameter from the measurements of the sensor during the predefined duration, the distributions forming a reference set of distributions indicative of a healthy rolling bearing, wherein processing the measurements of the sensors comprises:

comparing each value of measurement to the associated distribution of the reference set of distributions, and initiating an alarm if a value of a parameter deviates from the associated distribution of the reference set of distributions of a value greater than a first predefined threshold or the rate of change of values of a parameter deviates from the associated distribution of the reference set of distributions of a second predefined threshold.

Advantageously, the parameter of the sensorized rolling element comprises the temperature of the sensorized rolling element, and/or the load applied on the sensorized rolling element, and/or the rotational speed of the sensorized rolling element, and/or the axial load offset acting on the sensorized rolling element, and/or the preload acting on the sensorized rolling element and/or the sensorized rolling element slip, the method comprising:

measuring the parameters by the sensor of the sensorized rolling element when the machine is operating during a predefined duration following the implementation of the rolling bearing in the machine, and determining a distribution of each parameter from the measurements of the sensor during the predefined duration, the distributions forming a reference set of distributions, training a machine learning algorithm from the reference set of distribution indicative of a healthy rolling bearing, wherein processing the measurements of the sensor comprises:

determining a distribution of each parameter from the measurements of the sensor during normal operation of the machine, the distributions forming an actual set of distributions, implementing the machine learning algorithm to compare the reference set of distribution and the actual set of distributions, and initiating an alarm if one of the actual set of distributions deviates from the associated distribution of the reference set of distributions of a value greater than a third predefined threshold.

Preferably, the parameter of the sensorized rolling element comprises the temperature of the sensorized rolling element, and/or the load applied on the sensorized rolling element, and/or the rotational speed of the sensorized rolling element, and/or the axial load offset acting on the sensorized rolling element, and/or the preload acting on the sensorized rolling element and/or the sensorized rolling element slip, the method comprising:

measuring at least one parameter by the associated sensor when the machine is operating during a predefined duration following the implementation of the rolling bearing in the machine, determining at least one second parameter indicative of the theoretical condition of the rolling bearing from a bearing control system, and determining a model of the rolling bearing linking the parameter measured by the sensors and the second parameter, wherein processing the measurements of the sensor comprises:

measuring the at least one parameter by the associated sensor during normal operation of the machine, determining at least one value of the second parameter from the bearing control system during normal operation of the machine, implementing the model by inputting the value of the at least one parameter to determine an output value generated by the model, comparing the output value generated by the model and the value of the second parameter, and initiating an alarm if the difference between the value of the second parameter determined by the model and the value of the second parameter measured by at least one sensor is greater than a fourth predefined threshold.

Advantageously, the model comprises a machine learning algorithm.

Preferably, the parameters of the sensorized rolling element comprise the load applied on the sensorized rolling element, the acceleration of the sensorized rolling element, and the angular position of the sensorized rolling element in the rolling bearing, the method comprises:

measuring the parameters by the sensors when the machine is operating during a predefined duration following the implementation of the rolling bearing in the machine, and determining a reference load pattern in one cycle of the rolling bearing from the measured parameters, wherein processing the measurements of the sensors comprises:

measuring the parameters by the sensors during normal operation of the machine, determining an actual load pattern in one cycle of the rolling bearing from the measured parameters, comparing the reference load pattern and the actual load pattern, and initiating an alarm if the actual load pattern deviates from the reference load pattern by a predetermined value.

Advantageously, the parameters of the rolling element comprise the acceleration of the sensorized rolling element, wherein processing the measurements of the sensors comprises:

measuring the acceleration by a sensor during normal operation of the machine, performing a Fourier analysis on the acceleration of the sensorized rolling element to generate a spectrum, and initiating an alarm if the variation of the spectrum is greater than a predetermined value.

Preferably, the parameters of the sensorized rolling element comprise the load applied on the sensorized rolling element and the angular position of the sensorized rolling element in the rolling bearing, wherein processing the measurements of the sensors comprises:

measuring the parameters by the sensors during normal operation of the machine, determining a polar plot representing the load given the angular position of the sensorized rolling element, and initiating an alarm if the load variation is greater than a predefined threshold.

According to another aspect, a monitoring system is proposed.

The monitoring system comprises a rolling bearing comprising a first ring and a second ring capable of rotating concentrically relative to one another, and at least one row of rolling elements interposed between a first raceway and a second raceway respectively provided on the first and second rings, wherein:

at least one of the rolling elements of the rolling bearing is a sensorized rolling element comprising at least one sensor measuring at least one parameter of the sensorized rolling element and a wireless transmitter to transmit the measurements of the sensor, and wherein the system comprising:

a receiving device configured to receive the measurements of the sensor of the sensorized rolling element of the rolling bearing, and a processing device configured to process the measurements received by the receiving device to detect damage and/or a contamination of the rolling bearing.

According to another aspect, a machine comprising a rolling bearing is proposed, the machine comprising a monitoring system as defined above.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other advantages and features of the invention will appear from the detailed description of embodiment of the invention, which are non-limiting example, illustrated on the appended drawing of which.

DETAILED DESCRIPTION OF THE PRESENT INVENTION

Figure 1:
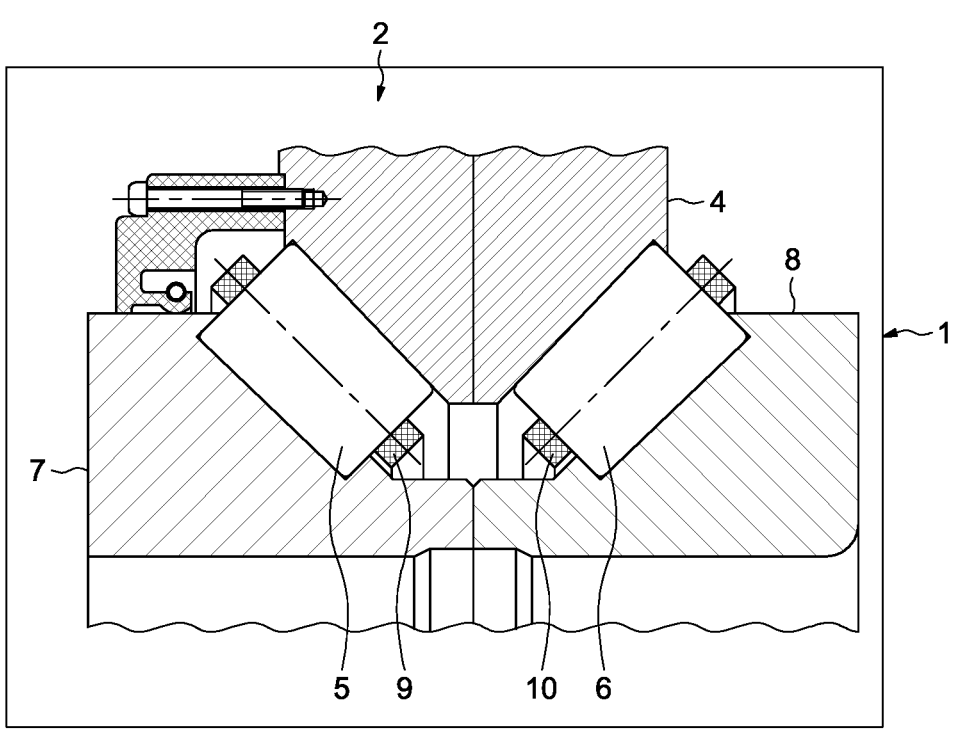
FIG. 1 illustrates schematically a machine according to the invention.
Figure 1:
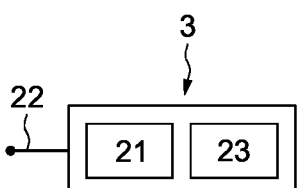

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center the invention. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C';—and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Reference is made to FIG. 1 which represents an example of a machine 1 comprising a rolling bearing 2, and a processing module 3.

The machine 1 is for example a wind turbine, the rolling bearing 2 supporting the main shaft of the wind turbine.

In other embodiments, the machine may be a tunnel boring machine, a mining extraction machine or a big offshore crane.

The bearing 2 comprises a first outer ring 4 provided with conically shaped first and second outer raceways for a first row 5 and a second row 6 of rolling elements comprising tapered rollers. The bearing further comprises a second ring 7, 8 comprising a first and second inner rings 7, 8 which are respectively provided with conically shaped first and second inner raceways for the first and second roller rows 5, 6. In addition, a first cage 9 and a second cage 10 are provided for retaining the rollers of the first and second roller sets respectively. Typically, the cages are formed from segments that abut each other in circumferential direction.

To provide the necessary stiffness and ensure a long service life, the bearing is preloaded. The axial position of the inner rings 7, 8 relative to the outer ring 4 is set such that the first and second roller sets 4, 6 have a negative internal clearance.

In the depicted bearing, at least one of the rolling elements in either of the first and second roller rows 5, 6 is replaced with a sensorized rolling element.

In the rolling bearing 2 comprises tapered rollers.

In another embodiment, the rolling bearing 2 may comprise other type of rolling elements, for example balls. The rolling bearing 2 may also comprise only one row of rolling elements or more than two rows of rolling elements.

Figure 2:
FIG. 2 illustrates schematically an example of a sensorized rolling element according to the invention.

FIG. 2 illustrates schematically an example of a sensorized rolling element.

The sensorized rolling element comprises a roller body 11 comprising a central bore 12, a sensor unit 13 within the central bore 12 that extends through the roller body 11.

The sensor unit 13 comprises a housing 14 formed from two semi-cylindrical housing haves which are fixed together by means of first and second end caps 15, 16 that screw onto corresponding first and second threaded portions 17, 18 at opposite axial ends of the housing. The sensor unit housing as a whole is shaped to fit within the roller bore 12, and is mounted to and located in the bore 12 by means of first and second sealing elements 19, 20.

The sensor unit 13 further comprises sensors, a wireless transmitter to transmit the measurements of the sensors measuring parameters relating to the condition of the sensorized rolling element, and a battery supplying the sensors and the wireless transmitter.

Each sensor comprises for example a load sensor for measuring the load distribution across the sensorized rolling element, and/or the preload acting on the sensorized rolling element and/or the axial load offset acting on the sensorized rolling element, and/or a temperature sensor for measuring the temperature of the sensorized rolling element, and/or an accelerometer for measuring the acceleration of the sensorized rolling element, for determining angular position of the sensorized rolling element and for determining the rotational speed of the sensorized rolling element and the sensorized rolling element slip, and/or a gyroscope for determining the rotational speed of the sensorized rolling element in the rolling bearing 2.

The processing module 3 (FIG. 1) comprises a receiving device 21 connected to an antenna 22 of the processing module 3, and a processing device 23.

The receiving device receives through the antenna 22 a real time signal emitted by the wireless transmitter of the sensor unit 13 and comprising the measurements of the sensors.

The processing device 23 processes the measurements received by the receiving device to detect damage of the rolling bearing 2 or a contamination of the rolling bearing 2.

The sensorized rolling element and the processing module 3 form a system for monitoring the rolling bearing 2 in the machine 1.

In the following, examples of methods for implementing the system are presented.

Figure 3:
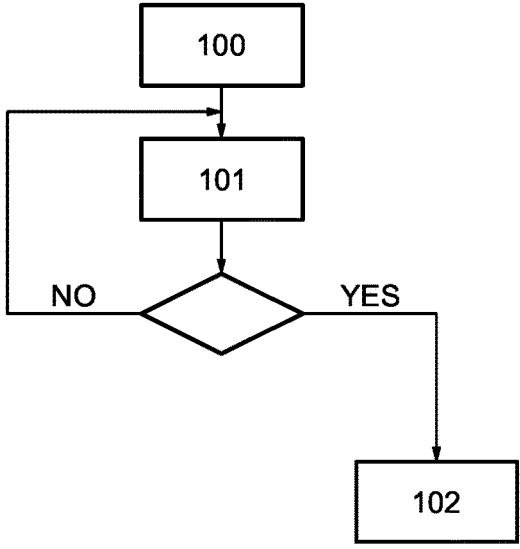
FIG. 3 a first method implementing a system for monitoring a rolling bearing according to the invention, FIG. 4 a second method implementing a system for monitoring a rolling bearing according to the invention, FIG. 5 a third method implementing a system for monitoring a rolling bearing according to the invention, FIG. 6 a fourth method implementing a system for monitoring a rolling bearing according to the invention, FIG. 7 a fifth method implementing a system for monitoring a rolling bearing according to the invention, FIG. 8 a sixth method implementing a system for monitoring a rolling bearing according to the invention.

FIG. 3 illustrates a first method implementing the system.

The sensors of the sensorized rolling element measure the parameters and comprise a temperature sensor, and/or load sensors for measuring the load, the axial load offset and the preload applied on the sensorized rolling element, and/or an accelerometer for measuring the rotational speed of the sensorized rolling element.

In step 100, when the machine 1 is operating during a predefined duration following the implementation of the rolling bearing 2 in the machine, the sensors measurements are received by the processing unit 3.

The processing unit 3 determines a distribution of at least one parameter from the measurements of the sensors during the predefined duration.

The distributions forming a reference set of distributions indicative of the healthy rolling bearing 2.

In step 101, during normal operation of the machine 1, the processing unit 23 compares each value of each measurement to the associated distribution of the reference set of distributions.

If a value of a parameter deviates from the associated distribution of the reference set of distributions of a value greater than a first predefined threshold or the rate of change of values of a parameter deviates from the associated distribution of the reference set of distributions of a second predefined threshold, the processing unit 23 initiates an alarm (step 102).

In the other case, the method continues at step 101.

By comparing the measurements during normal operation of the machine 1 to the reference set of distributions, the processing unit 23 detects a damage on the bearing 2 by comparing the trend of measurements to the reference set of distributions indicative of a healthy bearing 2.

Figure 4:
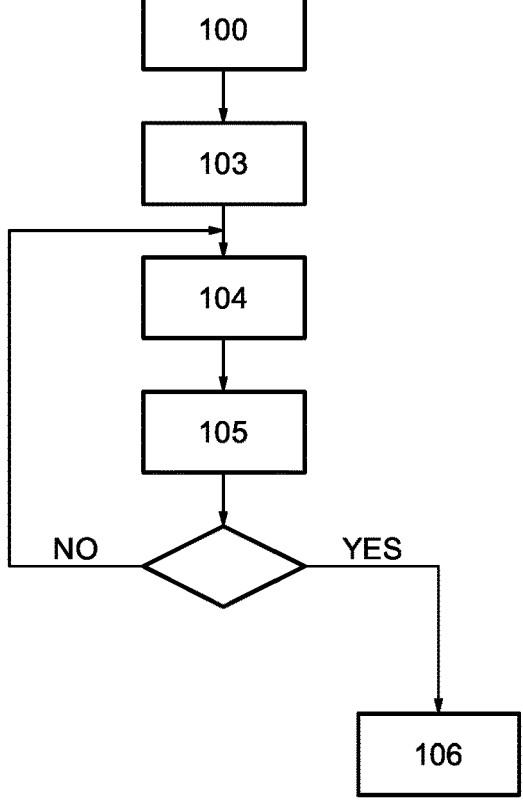

FIG. 4 illustrates a second method implementing the system.

The processing unit 23 comprises a machine learning algorithm.

The sensors of the sensorized rolling element measure the parameters and comprise a temperature sensor, and/or load sensors for measuring the load, and/or the axial load offset and/or the preload applied on the sensorized rolling element, and/or an accelerometer for measuring the rotational speed of the sensorized rolling element.

The second method starts with step 100 as defined above.

Then, in step 103, the processing unit 23 trains the machine learning algorithm from the reference set of distributions to identify the bearing 2 in healthy conditions (when the machine 1 is operating during a predefined duration following the implementation of the rolling bearing 2 in the machine).

In step 104, during normal operation of the machine 1, the processing unit 23 determines a distribution of each parameter from the measurements of the sensors.

The distributions form an actual set of distributions.

In step 105, the machine learning algorithm implemented by the processing unit 23 compares the reference set of distributions and the actual set of distributions.

If one of the actual set of distributions deviates from the associated distribution of the reference set of distributions by a value greater than a third predefined threshold, the processing unit 23 initiates an alarm (step 106).

In the other case, the method continues at step 104.

By comparing the distribution of the measurements during normal operation of the machine 1 to the reference set of distributions, the trained machine learning algorithm detects a damage on the bearing 2.

Figure 5:
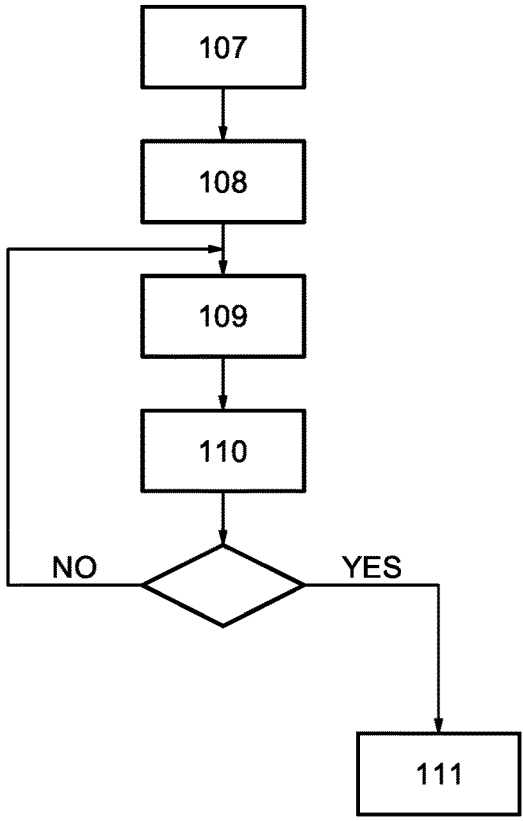

FIG. 5 illustrates a third method implementing the system.

The sensors of the sensorized rolling element measure at least two parameters and comprise a temperature sensor, and/or load sensors for measuring the load, and/or the axial load offset and/or the preload applied on the sensorized rolling element, and/or an accelerometer for measuring the rotational speed of the sensorized rolling element.

It is assumed that the bearing 2 is connected to a bearing control system which determines at least one second parameter indicative of the theoretical condition of the rolling bearing, for example the speed of the rolling bearing, and/or the load acting on the rolling bearing, and/or the ambient temperature of the bearing.

In step 107, when the machine 1 is operating during a predefined duration following the implementation of the rolling bearing 2 in the machine, at least one parameter is measured by the associated sensor and the measurement is received by the processing unit 23.

In step 108, the processing unit 23 receives a value of the second parameter determined by the bearing control system.

In step 109, a model of the rolling bearing is determined by the processing unit 23 so that the model outputs the value of the second parameter when the value of the one parameter determined by the sensor is inputted in the model.

The model links the parameter measured by the sensors and the second parameter.

The model links for example the speed of the rolling bearing and the load applied on the sensorized rolling element.

In another embodiment, the model links more than one parameter measured by the associated sensor to more than one parameter indicative of the theoretical condition of the rolling bearing delivered for example by the bearing control system.

For example, the model links the sensorized roller temperature to the speed of the rolling bearing, the load applied on the bearing, and the bearing temperature.

The model implements for example a machine learning algorithm.

In step 110, the one parameter is measured by the associated sensor during normal operation of the machine and transmitted to the processing unit 23.

The processing unit 23 implements the model of the bearing by inputting the received measurement so that the model generates an output value.

The processing unit 23 further receives from the control bearing unit the value of the second parameter associate with the measurement of the one parameter.

The processing unit 23 compares the value of the second parameter and the output value generated by the model.

If the difference between the value of the second parameter determined and the output value generated by the model is greater than a predefined threshold (step 111), the processing unit 23 initiates an alarm.

In the other case, the method continues at step 109.

By comparing parameters indicative of the theoretical condition of the rolling bearing and actual parameters (output of the model) of the rolling bearing obtain by the model of the rolling bearing and the measurements delivered by the sensorized roller, the system detects a damage on the bearing 2.

The first, second and third methods of implementing the system detect a damage on the rolling bearing.

The methods of implementing the system presented in the following detect a contamination and/or a surface damage of the rolling bearing.

Figure 6:
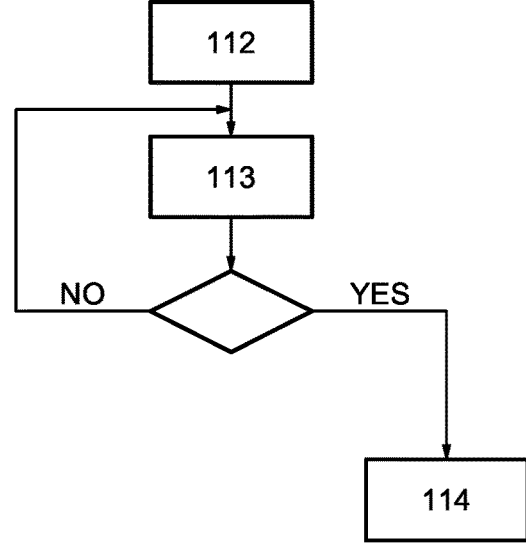

FIG. 6 illustrates a fourth method of implementing the system.

The sensors of the sensorized roller comprise load sensors for measuring the load, an accelerometer for measuring the rotational speed of the sensorized rolling element and for determining the angular position of the sensorized rolling element.

The sensors of the sensorized roller may comprise a gyroscope for measuring the rotational speed of the sensorized rolling element in the rolling bearing.

The parameters comprise the load applied on the sensorized rolling element, the acceleration of the sensorized rolling element, and the angular position of the sensorized roller in the rolling bearing.

In step 112, when the machine is operating during a predefined duration following the implementation of the rolling bearing in the machine, the sensors of the sensorized roller measure the parameters.

The processing unit 23 receives the measurements, reconstructs the angular position of the sensorized rolling element in the rolling bearing from the signals delivered by the accelerometer, and determines a reference load pattern in one cycle of the sensorized rolling element from the measured parameters linking the load applied on the sensorized rolling element and the angular position of the sensorized rolling element in the bearing.

In step 113, the sensors measure the parameters during normal operation of the machine.

The processing unit 23 receives the measurements and determines an actual load pattern in one cycle of the rolling bearing 2 from the measured parameters.

The processing unit 23 further compares the reference load pattern and the actual load pattern.

If the actual load pattern deviates from the reference load pattern by a predetermined value (step 114), the processing unit 23 initiates an alarm.

When the rolling bearing is in good condition, the actual load pattern is identical to the reference load pattern for identical working conditions.

Deviation of the actual pattern from the reference load pattern or spikes in the accelerometer signal indicates a surface damage or contamination.

The analysis of the periodicity and the form of the actual load pattern deviating from the reference load pattern permits to determine if the rolling bearing is damage or contaminated.

Figure 7:
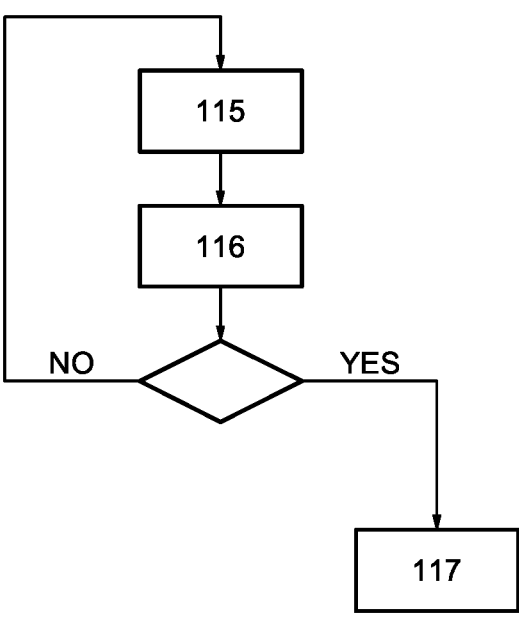

FIG. 7 illustrates a fifth method of implementing the system.

The sensors of the sensorized rolling element comprise an accelerometer for measuring the acceleration of the sensorized rolling element.

The parameters comprise the acceleration of the sensorized rolling element.

In step 115, during normal operation of the machine, the accelerometer measures the acceleration of the sensorized rolling element.

In step 116, the processing unit 23 receives the measurements of the accelerometer and performs a Fourier analysis on the acceleration of the sensorized rolling element to generate a spectrum.

If the variation of the spectrum is greater than a predetermined value (step 11), the processing unit 23 initiates an alarm.

A contamination of the rolling bearing or a damage on a raceway appears on the spectrum at different frequency bands by variations of the frequencies.

Figure 8:
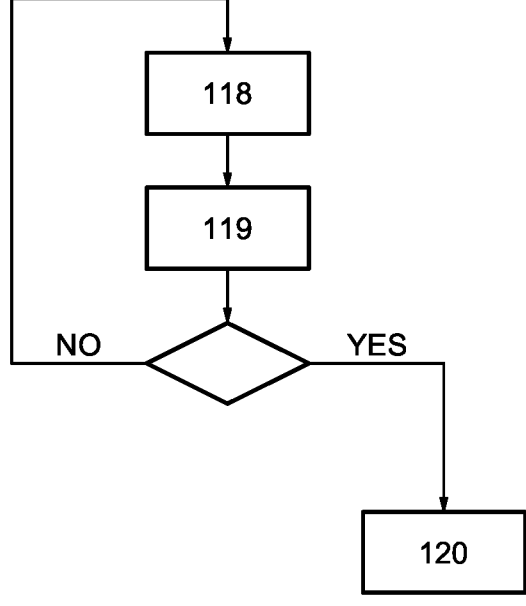

FIG. 8 illustrates a sixth method of implementing the system.

The sensors of the sensorized rolling element comprise load sensors for measuring the load, and an accelerometer for determining the angular position of the sensorized rolling element in the rolling bearing.

The parameters comprise the load applied on the sensorized rolling element and the angular position of the sensorized rolling element in the rolling bearing.

In step 118, during normal operation of the machine, the load sensors measure the load applied on the sensorized rolling element and the accelerometer measures the rotational speed of the sensorized rolling element in the rolling bearing. The processing unit 23 reconstructs the angular position of the sensorized rolling element from the signals delivered by the accelerometer.

In step 119, the processing unit 23 determines a polar plot representing the load applied on the sensorized rolling element given the angular position of the rolling bearing 2.

If the load variation is greater than a predetermined value (step 20), the processing unit 23 initiates an alarm.

If a surface damage appears on one of the raceways, for example a spall, the sensorized rolling element falls into the spall and the load measured by the sensors varies.

The duration of the load variation indicated the length of the spall.

The sixth method also allows to detect load variations in the structure around the rolling bearing.

Deformation of the rolling bearing causes abnormal and unexpected variations in the load measured by the load sensors.

The load variations are analysed and evaluated to detect structural damages on the rolling bearing.

The methods permit to detect damages on the rolling bearing in a reliable and easy way, the accuracy of detection of damages being not dependent on the speed of the rolling bearing.

Further, some of the presented methods permit to detect contamination of the rolling bearing or surface damage on the raceways of the rolling bearing.

The proposed methods permit to detect a damage of the rolling bearing from sensors implemented in the sensorized rolling element at early stage before the damage deteriorate irremediably the rolling bearing to initiate preventive actions when the alarm is initiated.

The four to fifth methods further permit to further detect a contamination of the rolling bearing.

The invention claimed is:

1. A method for monitoring a rolling bearing in a machine, the rolling bearing comprising a first ring and a second ring capable of rotating concentrically relative to one another, and at least one row of rolling elements interposed between a first raceway and a second raceway respectively provided on the first and second rings, at least one of the rolling elements is a sensorized rolling element comprising at least one sensor measuring at least one parameter of the sensorized rolling element, the method comprising:

transmitting measurements of the sensor by a wireless transmitter of the sensorized rolling element, receiving the measurements of the sensor by a receiving device, processing the measurements received from the receiving device by a processing device to detect damage or a contamination of the rolling bearing, wherein the parameters of the sensorized rolling element comprise the load applied on the sensorized rolling element, the acceleration of the sensorized rolling element, and the angular position of the sensorized rolling element in the rolling bearing, the method comprises:

measuring the parameters by the sensors when the machine is operating during a predefined duration following the implementation of the rolling bearing in the machine, and determining a reference load pattern in one cycle of the rolling bearing from the measured parameters, wherein processing the measurements of the sensors comprises:

measuring the parameters by the sensors during normal operation of the machine, determining an actual load pattern in one cycle of the rolling bearing from the measured parameters, comparing the reference load pattern and the actual load pattern, and initiating an alarm if the actual load pattern deviates from the reference load pattern by a predetermined value.

2. A method for monitoring a rolling bearing in a machine, the rolling bearing comprising a first ring and a second ring capable of rotating concentrically relative to one another, and at least one row of rolling elements interposed between a first raceway and a second raceway respectively provided on the first and second rings, at least one of the rolling elements is a sensorized rolling element comprising at least one sensor measuring at least one parameter of the sensorized rolling element, the method comprising:

transmitting measurements of the sensor by a wireless transmitter of the sensorized rolling element, receiving the measurements of the sensor by a receiving device, processing the measurements received from the receiving device by a processing device to detect damage or a contamination of the rolling bearing, wherein the parameters of the sensorized rolling element comprise the load applied on the sensorized rolling element and the angular position of the sensorized rolling element in the rolling bearing, wherein processing the measurements of the sensors comprises:

measuring the parameters by the sensors during normal operation of the machine, determining a polar plot representing the load given the angular position of the sensorized rolling element, and initiating an alarm if the load variation is greater than a predefined threshold.

* * * * *